(12) United States Patent
Yang et al.

(10) Patent No.: US 8,923,372 B2
(45) Date of Patent: Dec. 30, 2014

(54) METHOD AND APPARATUS FOR IMPROVED PARALLEL RF TESTING OF MULTIPLE DEVICES

(75) Inventors: Michael Shih Chiang Yang, Saratoga, CA (US); Lin Guo, Los Altos, CA (US)

(73) Assignee: Insight Scientific International (Shanghai) Ltd. (CN)

( * ) Notice: Subject to any disclaimer, the term of this patent is extended or adjusted under 35 U.S.C. 154(b) by 101 days.

(21) Appl. No.: 13/443,242

(22) Filed: Apr. 10, 2012

(65) Prior Publication Data

US 2013/0266051 A1    Oct. 10, 2013

(51) Int. Cl.
*H04B 17/00*      (2006.01)
(52) U.S. Cl.
CPC .......... *H04B 17/008* (2013.01); *H04B 17/0085* (2013.01)
USPC ........... 375/224; 375/267; 375/299; 375/316; 375/347; 455/67.11; 455/101; 455/132; 455/500; 455/562.1; 370/235; 370/464; 714/712
(58) Field of Classification Search
CPC ............. H04B 17/0085; H04B 17/008; H04B 17/004; H04B 17/0042; H04B 3/46; H04L 1/20; H04L 1/24
USPC ........................ 375/224, 267, 299, 316, 347; 455/67.11, 101, 132, 500, 562.1; 370/235, 464; 714/712
See application file for complete search history.

(56) References Cited

U.S. PATENT DOCUMENTS

| | | | |
|---|---|---|---|
| 7,275,197 B2 * | 9/2007 | Inaba et al. ................... | 714/740 |
| 8,036,617 B2 | 10/2011 | Olgaard | |
| 2006/0274657 A1 * | 12/2006 | Olgaard et al. ............... | 370/235 |
| 2010/0123471 A1 * | 5/2010 | Olgaard et al. ............... | 324/754 |
| 2010/0148827 A1 | 6/2010 | Olgaard | |
| 2010/0261431 A1 * | 10/2010 | Olgaard ..................... | 455/67.11 |
| 2012/0269288 A1 * | 10/2012 | Olgaard et al. ............... | 375/296 |

* cited by examiner

*Primary Examiner* — Leon Flores
(74) *Attorney, Agent, or Firm* — Innovation Counsel LLP

(57) ABSTRACT

A system for parallel radio frequency (RF) testing. The system includes a plurality of signal generators, a plurality of signal analyzers, a data bus connected to the plurality of signal generators, and a controller. The controller has a connection to the data bus so as to be in electronic communication with the plurality of signal generators, and has a plurality of point to point links to respective ones of the signal analyzers so as to be in electronic communication with the plurality of signal analyzers.

20 Claims, 4 Drawing Sheets

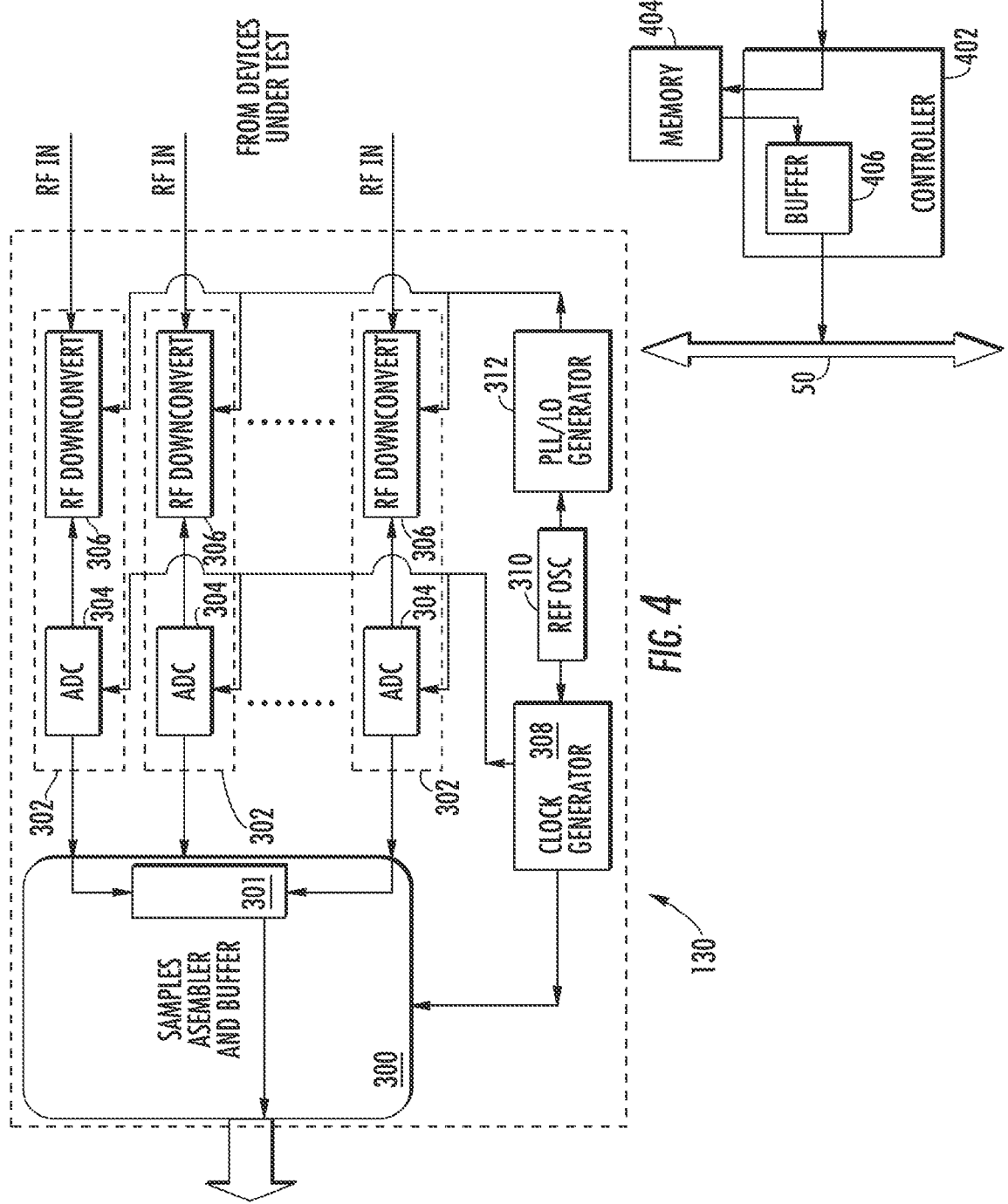

METHOD AND APPARATUS FOR IMPROVED PARALLEL RF TESTING OF MULTIPLE DEVICES

BRIEF DESCRIPTION

Embodiments of the invention relate generally to radio frequency (RF) testing. More specifically, embodiments of the invention relate to methods and apparatuses for parallel RF testing of multiple devices.

BACKGROUND

The recent proliferation of wireless devices and other systems with RF transmission/reception capability, such as cellular phones and RF modules, as well as other RF-capable devices like ICs, base stations, RF transmitters, and many other wireless systems, has led to an increase in demand for RF test equipment. This test equipment, usually used to test the RF functionality of manufactured wireless devices prior to their sale, typically operates by transmitting RF test signals, including data and/or commands, to a target wireless device, or device under test. The device under test is programmed to generate specific RF signals in response, and transmits these responsive signals back to the test equipment, where the signals are analyzed to determine the working condition of the device under test.

However, current RF test equipment suffers from a number of drawbacks. For example, current equipment is often limited in its ability to scan multiple devices under test in parallel. The RF test process thus often suffers from low throughput, slowing the manufacturing and verification process. Accordingly, ongoing efforts exist to improve the speed and quality of both RF test equipment and the RF testing process.

SUMMARY

The invention can be implemented in many ways, for example as a system and as a method. In one embodiment, a system for parallel radio frequency (RF) testing comprises a plurality of signal generators, a plurality of signal analyzers, a data bus connected to the plurality of signal generators, and a controller. The controller has a connection to the data bus so as to be in electronic communication with the plurality of signal generators, and has a plurality of point to point links to respective ones of the signal analyzers so as to be in electronic communication with the plurality of signal analyzers.

In another embodiment, a vector signal generator for RF testing comprises an input for receiving a digital representation of a test signal, a buffer memory in electronic communication with the input and configured to store the received digital representation of a test signal, and one or more signal conversion blocks. The signal conversion blocks are each in electronic communication with the buffer memory so as to receive the received digital representation of a test signal from the buffer memory, are each configured to generate the RF test signal from the received digital representation of a test signal, and are each configured to transmit the generated RF test signal to a device under test.

In a further embodiment, a vector signal analyzer for RF testing comprises a buffer memory, and one or more signal receiving blocks. The signal receiving blocks are each in electronic communication with the buffer memory. Each signal receiving block is configured to receive an RF test result signal from a corresponding device under test, to generate a result signal from the received RF test result signal, and to transmit the result signal to the buffer memory.

In a still further embodiment, a method of conducting parallel RF testing of multiple devices under test comprises retrieving a digital representation of a test signal, and placing the digital representation of a test signal on a data bus in electronic communication with a plurality of signal generators. The placing is done so as to transmit the digital representation of a test signal to each of the signal generators. The method further includes receiving result signals over a plurality of point to point links, the test results corresponding to RF signals generated by a plurality of devices under test as a result of ones of the test signals transmitted to the devices under test by the signal generators.

In a yet further embodiment, a vector signal generator for RF testing comprises an input for receiving a digital representation of a test signal, and a buffer memory in electronic communication with the input and configured to store the received digital representation of a test signal. The vector signal generator also includes a digital to analog converter in electronic communication with the buffer memory so as to receive the received digital representation of a test signal from the buffer memory, where the digital to analog converter is configured to receive the digital representation of a test signal from the buffer memory and to convert the digital representation of a test signal to an analog signal. Also included is an RF upconverter in electronic communication with the digital to analog converter so as to receive the analog signal from the digital to analog converter, where the RF upconverter is configured to upconvert the analog signal to the RF test signal. Further included is a plurality of power amplifiers each in electronic communication with the RF upconverter so as to receive the RF test signal from the RF upconverter, each power amplifier being configured to amplify its received RF test signal for transmission to a device under test.

BRIEF DESCRIPTION OF THE DRAWINGS

For a better understanding of the invention, reference should be made to the following detailed description taken in conjunction with the accompanying drawings, in which:

FIG. 4 is a block diagram illustration of vector signal analyzers constructed in accordance with an embodiment of the present invention.

FIG. 5 illustrates an exemplary data path in a conventional vector signal analyzer.

Like reference numerals refer to corresponding parts throughout the drawings.

DETAILED DESCRIPTION

Figure 1:
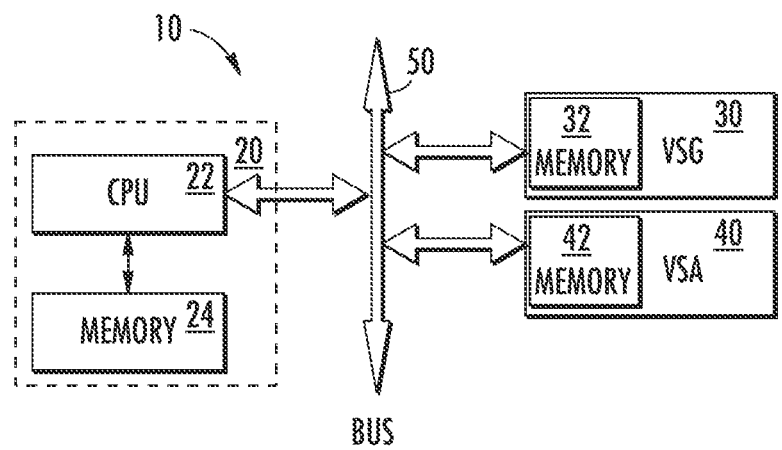
FIG. 1 is a block diagram illustration of a conventional RF test equipment architecture.

In one embodiment, the invention is an architecture for an RF test apparatus, in which a data bus is used in the RF out path, but a number of point to point links are used for the RF in path. More specifically, a central controller connects to both a data bus and a plurality of point to point links. In turn, the data bus connects to a number of vector signal generator (VSG) modules, while the point to point links connect to a number of vector signal analyzer (VSA) modules. The controller transmits digital test waveforms to the VSG modules via the data bus, which upconvert the waveforms to RF signals and transmit them to devices under test. The devices receive the RF signals and transmit responsive RF signals to the VSAs, which downconvert the received signals and transmit them directly to the controller via the point to point links.

The above described architecture produces a number of advantages over conventional RF test equipment. To better understand these advantages, reference is first made to FIG. 1, which illustrates a conventional architecture for RF test equipment. More specifically, a conventional RF test apparatus 10 has a central controller 20, one or more VSG cards 30, and one or more VSA cards 40, where the controller 20 is connected to the VSG 30 and VSA 40 through a data bus 50. The controller 20 typically includes a central processing unit (CPU) 22 and central memory 24. The VSG 30 and VSA 40 are placed in RF communication with a device under test (not shown).

The central memory 24 stores a number of waveforms that can be transmitted to a device under test, in order to test the functionality of its RF components. In operation, the CPU 22 retrieves one or more waveforms from the memory 24, and loads them onto the bus 50 where they are transmitted to the VSG 30. The VSG 30 stores the waveforms in its local memory 32. When the device under test is to be tested, the VSG 30 retrieves the typically digital waveforms from its local memory 32, converts them to an analog signal, upconverts this signal to RF frequencies, and transmits the RF signal to the device under test, where it acts as a test signal. In particular, the device under test is programmed to generate and transmit different RF signals in response to the test signal. The VSA 40 receives these responsive RF signals, downconverts them to baseband frequencies, and converts them to digital signals, where they are stored in the local memory 42 of the VSA 40. At the appropriate time, the VSA 40 retrieves this digital information, i.e. the digital representation of the RF signals received by the device under test, and places it on the bus 50, where it is eventually conveyed to the CPU 22 for analysis. The nature of the data collected by the VSA 40 indicates whether the RF components of the device under test are functioning properly and, if not, what is wrong.

The architecture of FIG. 1 possesses a number of shortcomings, however. Because the CPU 22 relies on a bus 50 for communication with the VSG 30 and VSA 40 rather than individual point to point links, communications between these components are often slower and, in particular, do not take place in real-time, as a conventional bus adds latency. In particular, since the VSG 30 and VSA 40 share the bus 50, the CPU 22 can only access one at a time. Communication between the CPU 22 and either the VSG 30 or VSA 40 is thus often delayed by a significant and variable amount of time, which slows the overall test process and reduces test throughput. Additionally, as detailed above, the conventional architecture requires the presence of local memories 32, 42 that are placed on the VSG 30 and VSA 40 cards, respectively. This is in addition to small buffer memories (not shown) placed between the bus 50 and memories 32, 42 and used to store information while waiting for the memory 32/bus 50 to become available. In particular, latency introduced by bus 50 typically requires VSGs 30 to store their waveforms for some time before use, and requires VSAs 40 to store their test data for some time, before the CPU 22 can be accessed. However, the resulting need for local memories 32, 42 presents drawbacks. Board space on VSGs 30 and VSAs 40 is typically at a premium, and space taken up by local memories 32, 42 is space that is often desired for other components. Also, the limited amount of space means that the local memories 32, 42 are of limited size, and can only store a limited number of waveforms/test data, limiting the kinds of testing that can be performed. Furthermore, the local memories 32, 42 are located on the VSG 30 and VSA 40 cards, and are thus prone to interfering with generated RF signals. For example, clock signals from memory controllers generate interference via their ground plane, which interferes with RF transmitter/receivers that share this ground plane. Also, the added room on the VSG 30/VSA 40 cards due to the lack of local memories 32, 42 allows for greater physical distance between the RF and digital traces, further reducing interference. Finally, the need for separate local memories 32, 42 for the VSG 30 and VSA 40 means that the local memories 32, 42 are suboptimally utilized. In particular, when the VSG 30 is operating, the VSA 40 is often idle, waiting for responsive RF signals from the device under test. Conversely, by the time the VSA 40 is receiving test data from the device under test, the VSG 30 is idle again, having finished transmitting the RF test signal. At any given time then, half of the local memories 32, 42 often sit unused, simply taking up real estate on their respective cards.

Figure 2:
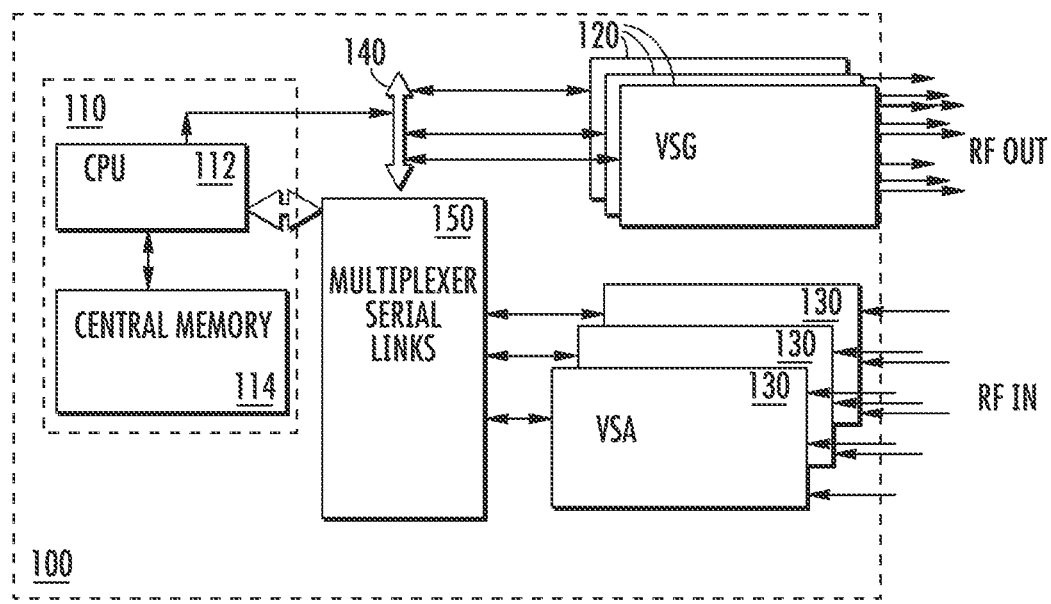
FIG. 2 is a block diagram illustration of an RF test architecture configured in accordance with an embodiment of the present invention.

To overcome these drawbacks, embodiments of the invention propose a different architecture. FIG. 2 is a block diagram illustration of an RF test architecture configured in accordance with an embodiment of the present invention. Here, an RF test apparatus 100 has a controller 110, multiple VSG cards 120, and multiple VSA cards 130. The VSG cards 120 are connected to the controller 110 through a data bus 140, and the VSA cards 130 are connected to the controller 110 via a multiplexed set of serial links 150. The controller 110 includes a CPU 112 and central memory 114. Each VSG 120 and each VSA 130 are placed in RF communication with one or more devices under test (not shown). That is, each VSG 120 and each VSA 130 can test one or more devices under test.

The data bus 140 is a conventional data bus, but is only connected to the VSGs 120, not the VSAs 130. The multiplexed set of serial links 150 comprises a multiplexer and a number of serial links, and is configured to provide a direct serial connection between each VSA card 130 and the controller 110. For example, the multiplexed set of serial links 150 can be a serial interface such as a PCIe interface, configured to connect a VSA 130 to the CPU 112 when data is desired to be transferred. In this manner, each of the VSA cards 130 is connected to the controller 110 through a point to point serial link.

It should be noted that the point to point links need not necessarily be implemented with a multiplexer, and can be implemented in any configuration that provides a direct link between a VSA 130 and the CPU 112 when the VSA 130 desires to transfer its data to the CPU 112. For example, the point to point links can be simply direct connections between each VSA 130 and pins of the controller 110. Also, the point to point links can take on any format or connection type capable of transferring test data. For example, the point to point links need not necessarily be limited to serial connections, but can be any other form of connection capable of transferring data to the controller 110.

In operation, when one or more devices under test are to be tested, the CPU 112 retrieves a desired digital representation of a test waveform from the central memory 114, and places it on the bus 140 for transmission to each of the VSGs 120. Each VSG 120 receives the digital test waveform, converts it to an analog signal, and upconverts the analog signal to an RF test signal. The VSGs 120 then transmit their RF test signals to their respective devices under test (as shown by the RF out arrows of FIG. 2). In response, the devices under test generate responsive RF signals, which are picked up by the corresponding VSAs 130 (as shown by the RF in arrows of FIG. 2). The VSAs 130 then downconvert their received signals to baseband, convert the baseband frequencies to digital signals, and transmit them to the CPU 112 via the multiplexer 150 for analysis. This operation can be termed signaling mode testing, i.e. testing via transmission of RF signals to and from the device under test. Operation can also proceed under what can be termed non-signaling mode testing. Here, the VSGs 120 would transmit their RF test signals to the devices under test as above, but the devices under test then transmit their responsive signals directly to the CPU 112 via a bus (not shown), without using the VSAs 130. Alternatively, operation can also proceed in a mode in which the controller 110 transmits a digital signal directly to the devices under test, such as via a bus or some other wired connection (not shown), and the devices under test transmit responsive RF signals to their respective VSAs 130.

Thus, while conventional RF testers have a bus 50 connected between the controller 20 and both the VSGs 30 and VSAs 40, embodiments of the invention provide an architecture in which only the controller 110 and VSGs 120 are connected by a bus 140. The VSAs 130 are not connected to the controller 110 by a bus (and in particular, are not connected via the same bus 140 that connects the VSGs 120 to the controller 110). Instead, each VSA 130 is connected to the controller 110 by its own point to point link.

Figure 3:
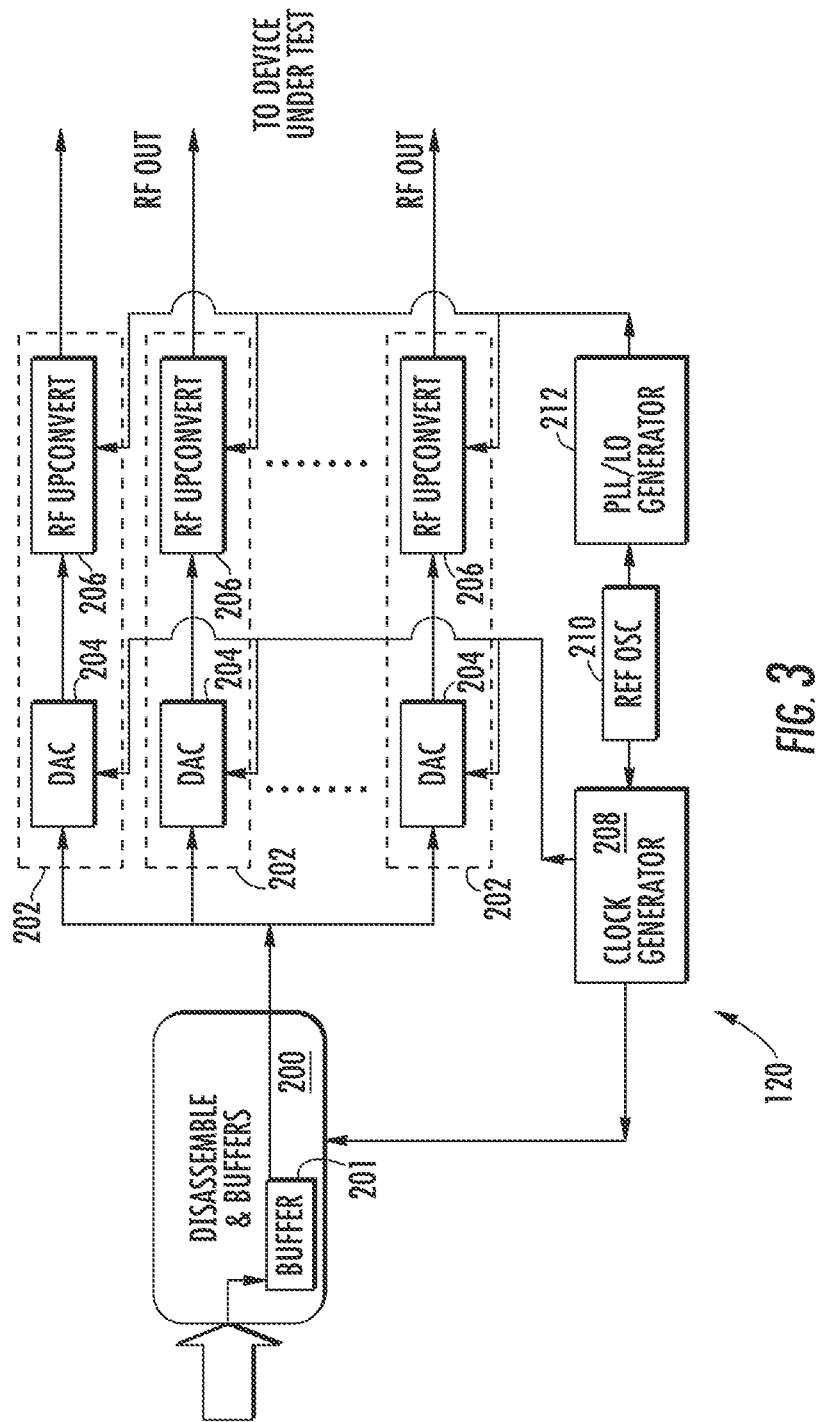
FIG. 3 is a block diagram illustration of vector signal generators constructed in accordance with an embodiment of the present invention.

The architecture of FIG. 2 allows each VSG 120 to be constructed in a more advantageous manner than that of FIG. 1. FIG. 3 is a block diagram illustration describing further details of an embodiment of an exemplary such VSG. Here, each VSG 120 contains a disassembly and buffer block 200 with one or more buffer memories 201. Also included are a number of signal generator blocks 202, a clock generator 208, reference oscillator 210, and PLL/LO generator 212. The block 200 performs disassembly, e.g. stripping out those portions of the data which are not signal information, such as header information, CRC (bit error correction) information, and the like.

Each signal generator block 202 has a digital to analog converter (DAC) 204, an RF upconverter 206, and an RF transmitter (not shown). The disassembly and buffer block 200 is connected to the DAC 204 of each signal generator block 202. Also, the clock generator 208 is connected to the DAC 204 of each signal generator block 202, and the PLL/LO generator 212 is connected to the RF upconverter 206 of each signal generator block 202.

In operation, waveforms are received from the data bus 140 and placed in the buffer 201, where they are simultaneously transmitted to each of the DACs 204. The DACs 204 convert each digital waveform to an analog signal which is then sent to the respective RF upconverter 206. The RF upconverters 206 upconvert these analog signals to RF signals via power amplifiers (not shown) according to each device's power requirement, and send the RF signals to the RF transmitter for transmission to a corresponding device under test. The clock generator 208 sends clock signals to the disassembly and buffer block 200 and DACs 204 to control the timing of each (i.e. when, and at what rate, information is transferred into and out of each of these blocks), and the PLL/LO generator 212 generates the local oscillator (LO) signal used by each RF upconverter 206 in upconversion. The clock generator 208 and PLL/LO generator 212 each operate in known fashion, generating their respective signals according to timing signals from reference oscillator 210.

One of ordinary skill in the art will observe that the components of each VSG 120 can be implemented on a single card, printed circuit board (PCB), or any other substrate capable of supporting electronic equipment, and such a configuration is preferable for many applications. However, one of ordinary skill in the art will observe that the VSG 120 can also be implemented as any number of separate cards, boards, or substrates. Furthermore, each VSG 120 can include any number of signal generator blocks 202. In particular, each signal generator block 202 can test one device under test at a time, so the addition of multiple signal generator blocks 202 allows each VSG 120 to test multiple devices simultaneously. Any number of signal generator blocks 202 is contemplated, and the number of such blocks 202 is only limited by constraints such as space on the VSG 120 card(s), data throughput, the number of devices to be tested, or the like.

Additionally, it can be observed that the VSG 120 employs only a buffer memory 201 and no other memory, while conventional designs also employ an additional memory 32 (e.g., FIG. 1). The buffer memory 201 is typically small, and meant only to store information long enough for the DACs 204 to come available, e.g. for a 16 bit DAC 204 running at 250 Mhz, the buffer memory 201 may be approximately 8 bytes (i.e. 4 plus header info, etc.). In contrast, the memory 32/42 is typically much larger (for example, conventional VSGs have a 512 mB memory), being meant to store entire waveforms, or multiple such waveforms, for later use in RF testing. Furthermore, the buffer memory 201 is structured differently than a typical memory like memories 32, 42. In particular, the buffer memory 201 is configured as a buffer, e.g. a FIFO or LIFO memory, which only outputs information in a predetermined order, based on how information is input. In contrast, memories 32, 42 are commonly structured as random access memories or the like, storing and retrieving information in different manner than a buffer and commonly requiring a separate controller.

The configuration of FIGS. 2 and 3 confers significant advantages over more conventional RF test configurations. For example, as above, only a buffer memory 201 is employed, and no memory 32, 42 is needed. That is, this configuration of the invention only employs a small memory configured as a buffer, and does not employ the larger, random access (or other) type memory 32, 42. As the larger memory 32, 42 takes up more space than the smaller buffer memory 201, this configuration of the invention frees up more space on the VSG 120 card, leaving more room to add additional signal generator blocks 202, or allowing the VSG 120 cards to be made smaller. Also, as the conventional memories 32 were placed on their VSG cards 30 thus acting as potential sources of noise for interfering with the generated RF signals, the configuration of FIGS. 2 and 3, with its lack of such memories, generates less noise and less interference, and is thus more reliable. Finally, RF testing time is reduced and throughput is increased, as data bus 140 only connects to the VSGs 120 rather than both VSGs 30 and VSAs 40, meaning that delays due to bus latency between VSAs 130 and CPU 112 are eliminated. Also, bus latency between the CPU 112 and VSGs 120 is improved, as the data bus 140 is not connected to the VSAs 130 and only waveform data are placed on the data bus 140, rather than both waveforms and test results. Additionally, the lack of an additional memory 32 means waveform data is sent directly from the buffer 201 to the DACs 204, skipping the additional step of storing/retrieving the waveforms in another memory and further reducing overall testing time. Furthermore, conventional VSGs are limited in the duration for which they can store waveform data. For example, the typical 512 mB memory of a conventional VSG is only large enough to store less than one second of waveform. By eliminating the buffer memory, embodiments of the invention avoid this problem entirely.

The VSGs 120 having been described, attention now turns to the VSAs 130. FIG. 4 is a block diagram illustration containing further details of VSAs 130 constructed in accordance with the embodiment of FIG. 2. As with the VSGs 120, the RF test apparatus 100 can include any number of VSAs 130, each configured to test multiple devices. Each VSA 130 has a sample assembler and buffer 300 connected to a number of signal receiving blocks 302, as well as a clock generator 308, reference oscillator 310, and PLL/LO generator 312. Each signal receiving block 302 has an analog to digital converter (ADC) 304, RF downconverter 306, and an RF antenna or receiver (not shown).

The sample assembler and buffer 300 is also connected to serial links 150. The sample assembler and buffer 300 is a controller that has a control module or processor (not shown) and a buffer memory 301 that assemble data samples, store the assembled samples in buffer memory 301, and output the assembled test data to the CPU 112 across the serial links 150.

In operation, each signal receiving block 302 receives an RF signal from its device under test through its RF receiver, and transmits the received RF signal to its downconverter 306. The downconverter 306 downconverts the RF signal to a baseband signal which is passed to the ADC 304 and converted to a digital signal. This digital signal is a digitized representation of the data transmitted by the device under test in response to RF test signals sent to the device by a VSG 120. The digital test data is then sent to the assembler and buffer 300, which assembles the test data into a format desired by the CPU 112, and stores the assembled data in buffer 301. The buffer 301 transmits its stored test data, in predetermined order, to the CPU 112.

The clock generator 308 sends clock signals to each ADC 304 to control its timing, while the PLL/LO generator 312 generates the LO signal used in downconversion, and sends this LO signal to each of the RF downconverters 306. The reference oscillator 310 generates a reference timing signal and sends it to both the clock generator 308 and PLL/LO generator 312, governing the timing of their respective clock and LO signals.

One of ordinary skill in the art will observe that, like the VSGs 120, the components of each VSA 130 can be implemented on a single card, PCB, or any other substrate capable of supporting electronic equipment, and alternatively, each VSA 130 can also be implemented as any number of separate cards. Furthermore, each VSA 130 can include any number of signal receiving blocks 302, and as each signal receiving block 302 can receive signals from one device under test at a time, the addition of multiple signal receiving blocks 302 allows each VSA 130 to receive test signals from multiple devices simultaneously. Any number of signal analysis blocks 302 is contemplated, and the number of such blocks 302 is only limited by constraints such as space on the VSA 130 card(s), data throughput, the number of devices to be tested, or the like. Thus, as any number of VSG cards 120 and any number of VSA cards 130 are contemplated, and each card 120, 130 can in turn contain blocks 202, 302 for testing multiple devices, RF testers 100 are able to test any number of RF devices in parallel.

As with the VSG 120, it can be observed that the VSA 130 employs only a buffer memory 301 and no other memory, while conventional designs also employ an additional memory 34 (e.g., FIG. 1). The buffer memory 301 is smaller than memory 42, e.g. an 8 B buffer for I and Q samples, and meant only to store information long enough for the CPU 112 to come available. In contrast, the memory 42 is typically much larger, e.g. approximately 512 MB in conventional VSAs (which allows for storage of about 0.5 seconds of information at an operating frequency of 250 Mhz), and meant to store test results until they can be placed on the bus 50. Furthermore, as with buffer memory 201, the buffer memory 301 is structured as a buffer, not as a random access memory or the like.

The above described configuration of VSA 130 provides multiple advantages over conventional configurations such as VSAs 40. First, each VSA 130 has a point to point link directly to CPU 112 via multiplexed serial links 150, instead of being connected to CPU 112 by a data bus 50. Test results are thus transferred to the CPU 112 without bus latency, i.e. time spent waiting for a bus 50 to come available. Instead, digitized result data can be sent directly to the CPU 112 with only the small amount of delay caused by storage in the buffer 301. As is known, bus latency is both significant and perhaps more importantly uncertain, with the amount of time spent waiting for a bus to come available changing from instance to instance. Thus, conventional VSAs 40 must wait for a significant and variable amount of time for the bus to come available, while the VSAs 130 of embodiments of the invention do not have this uncertain and varying delay. Data are thus output to CPU 112 much faster than in the conventional configuration, which must wait for a data bus 50 to come available.

Second, the lack of memory on VSA 130 allows for faster throughput of test data. From FIG. 4, it can be seen that VSA 130 only stores data once, in buffer 301. That is, the VSA 130 only conducts a single write operation for any given data. In contrast, convention configurations require at least two write operations, taking more time and reducing throughput. To explain this point in further detail, FIG. 5 illustrates an exemplary data path in a conventional vector signal analyzer. Here, an ADC 400 outputs digitized test data to a controller 402, which first stores it in memory 404. The bus 50 typically handles multiple test data as well as waveforms for the VSGs 30, and as a result is not always immediately available to handle new test results. Accordingly, results are stored in memory 404 until the bus 50 is available, whereupon the results are transferred to buffer 406 and then output to bus 50. This process entails two write operations (a write to memory 404, then a write to buffer 406), as well two read operations (a read from memory 404, and a read from buffer 406). In contrast, the VSAs 130 of embodiments of the invention conduct only a single write and read operation (to and from buffer 301). The VSA 130 thus offers speed and throughput advantages, allowing more devices to be tested faster. Thus, throughput is improved by both removing memory 404 and its additional read/write operation, and by providing a direct point to point link between the VSA 130 and CPU 112, rather than a data bus 50.

Third, similar to the VSGs 120, the lack of a memory (besides the buffer 301) on the VSAs 130 means that the VSAs 130 perform more reliably and take up less real estate on a card, allowing for addition of other functions, more signal receiving blocks 302, or simply smaller cards.

In summary, the architecture of FIG. 2 offers distinct advantages over conventional RF tester configurations. Utilizing point to point links rather than a bus to connect the VSAs 130 to the CPU 112 means that test data can be sent to the CPU 112 with much less delay, as the test data is simply sent directly to the CPU 112 as soon as it is available, eliminating the need to wait for bus allocation time. Delay is further reduced by only reading/writing the test data once, rather than twice. This reduction in delay means that test data samples can be collected and sent to the CPU 112 and/or central memory 114 effectively in real time. This in turn allows the CPU 112 to process the data and generate or retrieve responsive waveforms to send to the appropriate VSGs 120 for further testing, where these waveforms can be sent with less delay as the bus 140 only transfers information to the VSGs 120, and not the VSAs 130. The RF test cycle is thus accelerated, reducing testing time and increasing throughput. Additionally, as multiple VSGs 120 and VSAs 130 can be employed simultaneously, and each VSG 120 and each VSA 130 can contain multiple signal generator blocks 202 and signal receiving blocks 302 respectively, many devices under test can be scanned simultaneously, or in parallel, thus further increasing throughput of the test cycle. Furthermore, the elimination of memories, needed in conventional VSGs 30 and VSAs 40 to store waveforms and test data, improves reliability and reduces space on each VSG/VSA card. This in turn leaves room for improvements in other components or simply allows each card to be made smaller and thus cheaper.

Figure 6:
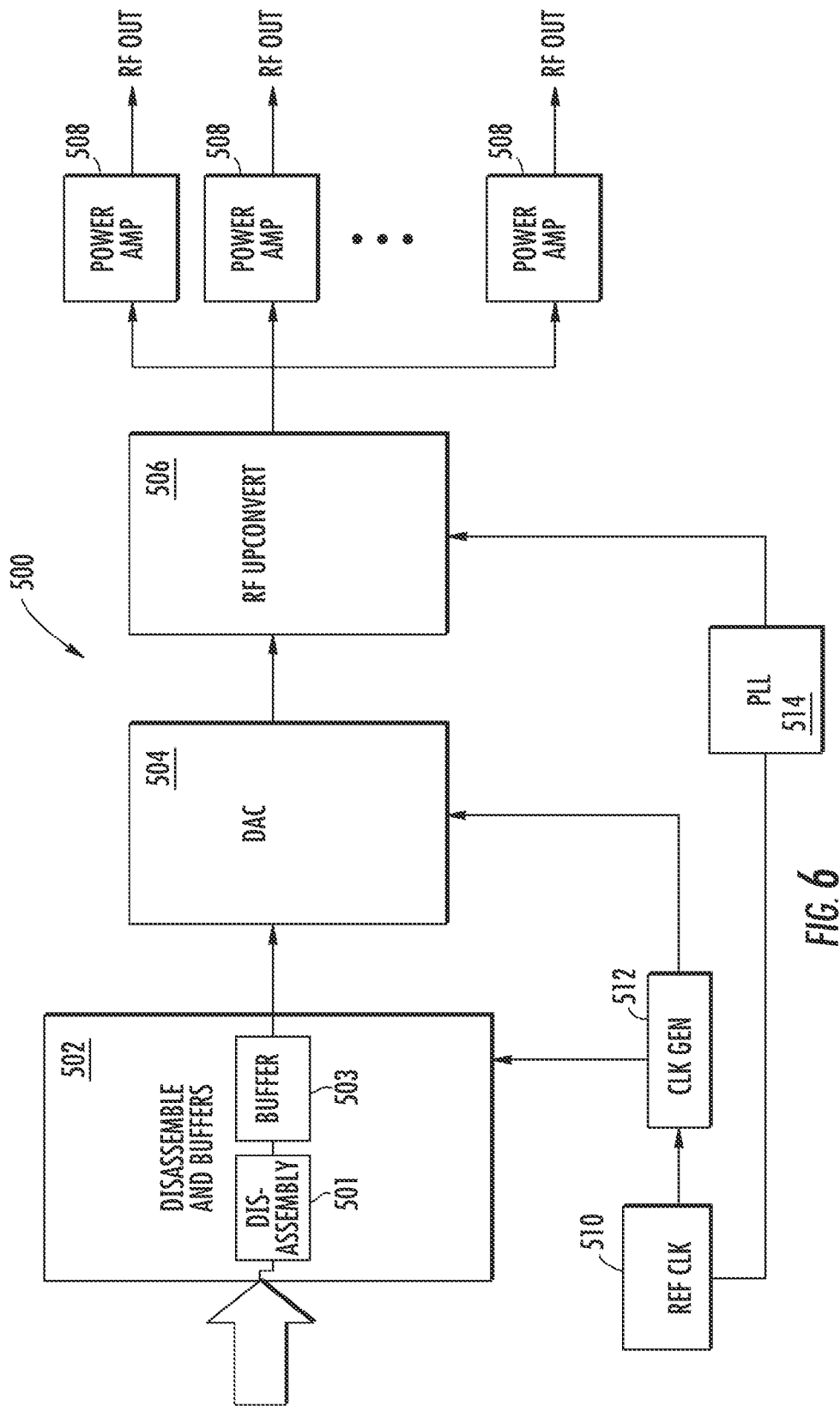
FIG. 6 is a block diagram illustration of a vector signal generator constructed in accordance with a further embodiment of the present invention.

It can be noted that each signal generator block 202 contains a DAC 204 and RF upconverter 206. Further advantages can thus be achieved by employing a common DAC and RF upconverter, rather than one for each block 202. FIG. 6 is a block diagram illustration of a vector signal generator constructed in accordance with such an embodiment. Here, a vector signal generator 500 contains a disassembly and buffer block 502, a DAC 504, an RF upconverter 506, and a number of power amplifiers 508, as well as a reference clock 510, clock generator 512, and PLL/LO generator 514.

The disassembly and buffer block 502 includes a disassembly block 501 and a buffer 503, and functions similar to the disassembly and buffer block 200. The clock generator 512 is connected to the DAC 504, and the PLL/LO generator 514 is connected to the RF upconverter 506.

The operation of signal generator 500 is similar to that of the VSG 120, except that a common DAC 704 and RF upconverter 706 are employed. In particular, waveforms are received from the data bus 140, disassembled by the disassembly block 501, and placed in the buffer memory 503, where they are transmitted to the DAC 504. The DAC 504 then converts the digital waveform to an analog signal which is then sent to RF upconverter 506. The RF upconverter 506 upconverts this analog signal to an RF signal in known manner, and sends the RF signal to a number of power amplifiers 508 which boost the RF signal to the proper signal power levels expected by the device under test. The boosted signals are then sent to RF transmitters (not shown) for transmission to a corresponding device under test. In this manner, the various amplifiers 508 transmit the same RF test signals to their devices under test substantially simultaneously, so that a number of devices are tested in parallel.

The clock generator 512 sends clock signals to the disassembly and buffer block 502 and DAC 504 to control the timing of each, and the PLL/LO generator 514 generates the local oscillator (LO) signal used by the RF upconverter 506 in upconversion. The clock generator 512 and PLL/LO generator 514 each operate in known fashion, generating their respective signals according to timing signals from reference clock 510.

As with the VSGs of previous embodiments, the components of each VSG 500 can be implemented on a single card, PCB, or any other substrate capable of supporting electronic equipment, or on any number of separate cards, boards, or substrates. Furthermore, each VSG 500 can include any number of power amplifiers 508, so that each VSG 500 can test multiple devices simultaneously. Any number of power amplifiers 508 is contemplated, and the number of such amplifiers 508 is only limited by constraints such as space on the VSG 500 card(s), data throughput, the number of devices to be tested, or the like.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, an RF test apparatus of embodiments of the invention can contain any number of VSGs 120 and any number of VSAs 130. In turn, each VSG 120 can contain any number of signal generator blocks 202, and each VSA 130 can contain any number of signal receiving blocks 302, so that any number of devices under test can be analyzed. Also, the various embodiments each have certain features that differ from those of other embodiments, and it is noted that the invention contemplates the mixing and matching of various features as desired. That is, further embodiments can be formed from the selection of various features from different embodiments. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system for parallel radio frequency (RF) testing, the system comprising:
   a plurality of signal generators;
   a plurality of signal analyzers;
   a data bus connected to the plurality of signal generators; and
   a controller having a connection to the data bus so as to be in electronic communication with the plurality of signal generators, and having a plurality of point to point links to respective ones of the signal analyzers so as to be in electronic communication with the plurality of signal analyzers.

2. The system of claim 1, wherein each of the plurality of point to point links provides a serial connection between its respective signal analyzer and the controller.

3. The system of claim 1, wherein each of the signal generators further comprises:
   a buffer memory for storing a digital representation of a test signal received from the controller via the data bus; and
   one or more signal conversion blocks each configured to receive the digital representation of a test signal directly from the buffer memory and generate an RF test signal from the received digital representation of a test signal, and to transmit the generated RF test signal to a corresponding one of the devices under test, the one or more signal conversion blocks each comprising:
      a digital to analog converter in electronic communication with the buffer memory, the digital to analog converter configured to receive the digital representation of a test signal directly from the buffer memory and to convert the digital representation of a test signal to an analog signal; and
      an RF upconverter in electronic communication with the digital to analog converter so as to receive the analog signal from the digital to analog converter, the RF upconverter configured to upconvert the analog signal to the RF test signal, and to transmit the RF test signal to the corresponding one of the devices under test.

4. The system of claim 3, wherein the buffer memory is configured to output information in a predetermined order according to how the information was inputted.

5. The system of claim 1, wherein each of the signal analyzers further comprises:
one or more signal receiving blocks each configured to receive an RF test result signal from a corresponding device under test, to generate a result signal from the received RF test result signal, and to transmit the generated result signal to the controller over the corresponding point to point link; and
a buffer memory for storing the generated result signal; wherein each of the one or more signal receiving blocks further comprises:
an RF downconverter configured to receive the RF test result signal from the corresponding device under test, and to downconvert the received RF test result signal to a baseband signal;
an analog to digital converter in electronic communication with the RF downconverter and the buffer memory and so as to receive the baseband signal from the RF downconverter, the analog to digital converter configured to convert the baseband signal to the generated result signal, and to transmit the generated result signal directly to the buffer memory.

6. The system of claim 1, wherein each of the point to point links comprises a serial connection between its respective signal analyzer and the controller.

7. The system of claim 1, wherein the controller is further configured to receive the result signals from each of the signal analyzers substantially simultaneously.

8. The system of claim 1, wherein the plurality of point to point links includes multiplexed serial links.

9. The system of claim 1, wherein the plurality of point to point links are directly connected to a central processing unit of the controller.

10. A vector signal generator for radio frequency (RF) testing, the vector signal generator comprising:
an input for receiving a digital representation of a test signal;
a buffer memory in electronic communication with the input and configured to store the digital representation of a test signal; and
a plurality of signal conversion blocks each in electronic communication with the buffer memory so as to receive the digital representation of a test signal directly from the buffer memory, each configured to generate the RF test signal from the digital representation of a test signal, and each configured to transmit the generated RF test signal to a device under test.

11. The vector signal generator of claim 10, wherein each of the a plurality of signal conversion blocks further comprises:
a digital to analog converter in electronic communication with the buffer memory so as to receive the received digital representation of a test signal from the buffer memory, the digital to analog converter configured to receive the entire digital representation of a test signal directly from the buffer memory and to convert the digital representation of a test signal to an analog signal; and
an RF upconverter in electronic communication with the digital to analog converter so as to receive the analog signal from the digital to analog converter, the RF upconverter configured to upconvert the analog signal to the RF test signal, and to transmit the RF test signal to its corresponding device under test.

12. The vector signal generator of claim 10, wherein the buffer memory is configured to output information in a predetermined order according to how the information was inputted.

13. A vector signal analyzer for radio frequency (RF) testing, the vector signal analyzer comprising:
a buffer memory; and
one or more signal receiving blocks each in electronic communication with the buffer memory, each signal receiving block configured to receive an RF test result signal from a corresponding device under test, to generate a result signal from the received RF test result signal, and to transmit the generated result signal directly to the buffer memory, wherein the buffer is in electronic communication with a controller over a point to point link.

14. The vector signal analyzer of claim 13, wherein each of the one or more signal receiving blocks further comprises:
an input for receiving the RF test result signal;
an RF downconverter in electronic communication with the input so as to receive the RF test result signal through the input, the RF downconverter configured to downconvert the received RF test result signal to a baseband signal;
an analog to digital converter in electronic communication with the RF downconverter so as to receive the baseband signal from the RF downconverter, the analog to digital converter configured to convert the baseband signal to the generated result signal, and to transmit the generated result signal directly to the buffer memory.

15. The vector signal analyzer of claim 13, further comprising a serial interface in electronic communication with the buffer memory and configured for interface with the point to point link, so as to place the buffer memory in electronic communication with the controller.

16. The vector signal analyzer of claim 13, wherein the buffer memory is configured to output information in a predetermined order according to how the information was inputted.

17. A method of conducting parallel radio frequency (RF) testing of multiple devices under test, the method comprising:
retrieving a digital representation of a test signal;
placing the digital representation of a test signal on a data bus in electronic communication with a plurality of signal generators, so as to transmit the digital representation of a test signal to each of the signal generators;
receiving result signals over a plurality of point to point links that are in electronic communication with a plurality of signal analyzers, the result signals corresponding to RF signals generated by a plurality of devices under test as a result of the digital representation of a test signal transmitted to the devices under test by each of the signal generators.

18. A vector signal generator for radio frequency (RF) testing, the vector signal generator comprising:
an input for receiving a digital representation of a test signal;
a buffer memory in electronic communication with the input and configured to store the digital representation of a test signal;
a digital to analog converter in electronic communication with the buffer memory so as to receive the digital representation of a test signal from the buffer memory, the digital to analog converter configured to receive the digital representation of a test signal directly from the buffer memory and to convert the digital representation of a test signal to an analog signal;

an RF upconverter in electronic communication with the digital to analog converter so as to receive the analog signal from the digital to analog converter, the RF upconverter configured to upconvert the analog signal to the RF test signal; and a plurality of power amplifiers each in electronic communication with the RF upconverter so as to receive the RF test signal from the RF upconverter, each power amplifier configured to amplify its received RF test signal for transmission to a device under test.

19. The vector signal generator of claim 18, wherein the digital to analog receives the entire digital representation of a test signal directly from the buffer memory.

20. The vector signal generator of claim 18, wherein the buffer memory is configured to output information in a predetermined order according to how the information was inputted.

* * * * *